United States Patent Office 3,429,725
Patented Feb. 25, 1969

3,429,725
CEMENT RETARDER COMPOSITION
John C. Keenum, Jr., Odenton, and Richard L. Angstadt, Silver Spring, Md., assignors to W. R. Grace & Co., New York, N.Y., a corporation of Connecticut
No Drawing. Filed Oct. 21, 1965, Ser. No. 500,278
U.S. Cl. 106—89        6 Claims
Int. Cl. C04b 7/56, 7/00

ABSTRACT OF THE DISCLOSURE

A process for producing cement mixtures having reduced hardening rates by adding 0.1 to 5 weight percent of a copper acetate or copper nitrate to the portland cement and mixing the ingredients.

---

This application relates to cement compositions having retarded hardening rates and to methods for making these compositions.

In summary, the process of this invention is a method for producing cement mixtures having reduced hardening rates comprising adding to an alite cement from about 0.1 to 5 percent of a copper salt, based on the dry weight of the alite cement, and intimately mixing the ingredients to provide a uniform distribution of the copper salt throughout the cement.

In summary, the process of this invention is a method for reducing the rate of hardening of alite cements comprising mixture an alite cement, water, and from 0.1 to 5 percent of a copper salt, based on the dry weight of the cement binder, and allowing the mixtures to harden.

In summary, the composition of this invention comprises an alite cement containing from about 0.1 to 5 percent of a copper salt, based on the dry weight of the cement binder.

In many of the uses of alite cements, of which portland cement and mortars and concretes containing portland cement are the most common examples, it is desirable to retard the rate of hardening thereof. The retardation gained using copper salts is useful in placing alite cement mortars and concretes in hot weather when ambient conditions tend to accelerate the hardening rate. In general, under both hot and cold ambient conditions, the use of copper salts as a retarder will effect an extension of the time available for mixing and placing such materials. In the process for cementing oil wells, the cement must remain sufficiently fluid to be pumped into the well without the use of high pump pressures and agitation of partially set cements.

It is the object of this invention to provide a method for retarding the hardening rate of alite cements with a copper salt retarder.

It is another object of this invention to provide alite cements having a retarded rate of hardening but without decreasing the final compressive strength of the set product.

The binder component in the cements, mortars and concretes used widely as a construction material is portland cement. Portland cement is manufactured by calcining a mixture of limestone and clay to form a clinker, and by grinding the clinker to a fine powder with gypsum. The major compounds found in portland cement clinker are tricalcium silicate, dicalcium silicate, tricalcium aluminate, and tetracalcium aluminoferrite. The tricalcium and dicalcium silicates are though to be the principal bonding constituent in the portland cement. Tricalcium silicate when mixed with water forms a calcium silicate hydrate known as tobermorite gel and calcium hydroxide. The dicalcium silicate when contacted with water forms similar products but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates has been obtained. Four general types of portland cements, varying principally in the relative quantities of tricalcium silicate and dicalcium silicate present therein, are commonly produced. The proportions of the princpal compounds present in each type of cement are shown in Table I.

TABLE I

| Cement type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" as employed herein is defined as including neat pastes, mortars, and concretes and the mixed, dry, unreacted ingredients of neat pastes, mortars, and concretes, comprising as alite cement binder, a composition containing greater than 20 percent tricalcium silicate, based on the dry weight of the composition. The most common alite cements are portland cements, and mortars and concretes containing portland cements. Most commercially available alite cements contain binders comprising from about 20 to 75 percent tricalcium silicate. The alite cement binder, or cement binder is the component which provides the desired bonding, for example, portland cement.

A wide range of the hardening rates can be obtained by producing cement having varying quantities of tricalcium silicate such as are shown in Table I. However, the particular proportion of the cement ingredients and the rate of hardening obtained is limited by the types of raw materials from which the cement is produced. As a result, for some uses even the Type IV cement does not harden at a desired slow rate.

Retarders are employed to meet these requirements. Retarders are compositions which have been found to decrease the initial rate of hardening of a cement. Alite cement retarders must not decrease the final compressive strength of the hardened cement, and copper salts meet this requirement.

Copper salts which have been found to be suitable as alite cement hardening rate retarders include cupric chloride, cupric sulfate, cupric nitrate, cupric acetate, etc. and mixtures thereof. Retardation of alite cements with copper salts can be obtained with from about 0.1 to 5 percent and preferably from about 0.2 to 0.8 percent of the copper salt, based on the weight of the cement binder. Concentrations of the copper salt greater than about 5 percent increase retardation but also tend to dilute the cement binder and decrease the compressive strength of the product.

The copper salts can be added to the alite cements by various techniques. Copper salts can be added to portland cement binder clinker prior to grinding and can be thoroughly mixed with the cement component during the grinding step. The retarder can also be added to the alite cement powder as a dry powder, slurry, or water solution, and the ingredients can be thoroughly mixed to uniformly disperse the active ingredients. The copper salts can be dissolved in the water with which the alite cement binder is mixed to form a hardening composition. The alite cement binder can be premixed with water and then mixed or contacted with the copper salt retarder. In general, the retarder can be added to the cement at any stage prior to its final hardening.

Our invention is further illustrated by the following specific, but non-limiting examples.

EXAMPLE 1

In this example varying concentrations of cupric acetate, cupric sulfate, cupric chloride, and cupric nitrate were mixed with several different Type I portland cements. The copper salts were added to the cement, dissolved in the mix water. A 0.40 water to cement ratio was used. The time of setting of the cements was determined by the ASTM method of test for time of setting of hydraulic cements by the Vicat Needle (ASTM C191–58). Three determinations were made for each additive, and the average value obtained is shown in Table A.

TABLE A

| Cement | Retarder | | Time of set, min. |
|---|---|---|---|
| | Composition | Concentration, wt. percent | |
| A | Blank | 0 | 292 |
| A | Cupric acetate | 0.30 | 342 |
| A | do | 0.40 | 433 |
| A | Cupric sulfate | 0.30 | 408 |
| A | do | 0.40 | 447 |
| A | Cupric nitrate | 0.50 | 466 |
| A | Cupric chloride | 0.50 | 531 |
| B | Blank | 0 | 334 |
| B | Cupric acetate | 0.25 | 349 |
| B | do | 0.50 | 519 |
| C | Blank | 0 | 355 |
| C | Cupric sulfate | 0.25 | 392 |
| C | do | 0.50 | 495 |

As shown in Table A, copper salts are active retarders for alite cements. Furthermore, the retardation obtained increases as the copper salt concentration in the alite cement increases.

EXAMPLE 2

This example shows that the compressive strength of the portland cement product is not changed by the use of copper salts as retarders.

Copper sulfate was added to a Type I portland cement as described in Example 1. Blanks and cement mixtures containing 0.50 wt. percent cupric sulfate were prepared for a 7 day compressive strength test. Other blanks and cement mixtures containing 0.50 wt. percent cupric sulfate were prepared for a 28 day compressive strength test. The ASTM method C109–58 for compressive strength was followed, and the results are shown in Table B.

TABLE B

| CuSO$_4$ conc., wt. percent | Compressive strength, p.s.i. | |
|---|---|---|
| | 7 day | 28 day |
| 0 | 2,292±162 | |
| 0.50 | 2,368±77 | |
| 0 | | 4,195±197 |
| 0.50 | | 4,250±188 |

Obviously, many modifications and variations of the invention as hereinabove set forth may be made without departing from the essence and scope thereof, and only such limitations should be applied as are indicated in the appended claims.

We claim:
1. A process for producing a cement mixture having a retarded hardening rate comprising,

(a) adding to a portland cement from about 0.1 to 5 percent of a copper salt selected from the group consisting of cupric acetate, cupric nitrate, and mixtures thereof based on the dry weight of the cement binder, and
 (b) thoroughly mixing the components of the mixture.

2. A process for producing a cement mixture having a retarded hardening rate comprising, (a) mixing from about 0.1 to 5 percent based on the dry weight of the cement binder of a copper salt selected from the group consisting of cupric acetate, cupric nitrate, and mixtures thereof with a portland cement binder clinker, and
 (b) grinding the mixture to form a fine particle size, homogeneous cement.

3. A process for producing a cement mixture having a retarded hardening rate comprising:

(a) adding water and a copper salt selected from the group consisting of cupric acetate, cupric nitrate, and mixtures thereof to a portland cement, the amount of copper salt added being from about 0.1 to 5 percent of the dry weight of the portland cement binder, and
 (b) thoroughly mixing the components of the mixture.

4. The process of claim 3 wherein the copper salt is added to the cement in a water solution.

5. A process for retarding the hardening rate of a portland cement comprising, (a) adding to a portland cement from about 0.1 to 5 percent of a copper salt selected from the group consisting of cupric acetate, cupric nitrate, and mixtures thereof based on the dry weight of the portland cement binder,
 (b) mixing the components to form a homogeneous mixture, and
 (c) adding water to the mixture.

6. A process for retarding the hardening rate of a portland cement comprising, (a) adding water to a portland cement to form a settable mixture, and
 (b) contacting the settable mixture with an aqueous solution of a copper salt selected from the group consisting of cupric acetate, cupric nitrate, and mixtures thereof in an amount equal to 0.1 to 5 percent based on the dry weight of the cement binder.

References Cited

UNITED STATES PATENTS

| 1,364,587 | 1/1921 | Sanders et al. | 106—97 |
| 1,296,468 | 3/1919 | Blumenberg | 106—89 |
| 1,994,438 | 3/1935 | Scholz | 106—90 |
| 2,857,286 | 10/1958 | Striker | 106—90 |
| 2,985,239 | 5/1961 | Shell | 106—97 |
| 3,331,695 | 7/1967 | Angstadt et al. | 106—89 |

OTHER REFERENCES

"Modern Concrete" vol. 21, No. 7, November 1957, p. 41.

TOBIAS E. LEVOW, *Primary Examiner.*

S. E. MOTT, *Assistant Examiner.*

U.S. Cl. X.R.

106—90, 102, 315